United States Patent
Noguchi et al.

(10) Patent No.: US 11,215,280 B2
(45) Date of Patent: Jan. 4, 2022

(54) GEAR CHANGE CONTROL DEVICE OF AUTOMATIC TRANSMISSION FOR VEHICLE

(71) Applicant: Honda Motor Co., Ltd., Tokyo (JP)

(72) Inventors: Tomoyuki Noguchi, Saitama (JP); Kazuma Sasahara, Saitama (JP); Hiroki Murasawa, Saitama (JP); Naoyuki Kubo, Saitama (JP); Hiroki Kato, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/218,189

(22) Filed: Mar. 31, 2021

(65) Prior Publication Data
US 2021/0301920 A1   Sep. 30, 2021

(30) Foreign Application Priority Data
Mar. 31, 2020  (JP) .............................. JP2020-062346

(51) Int. Cl.
*F16H 61/04* (2006.01)
*F16H 61/00* (2006.01)
*B60W 10/10* (2012.01)

(52) U.S. Cl.
CPC .............. *F16H 61/04* (2013.01); *B60W 10/10* (2013.01); *B60W 2510/18* (2013.01); *B60W 2520/10* (2013.01); *B60W 2540/10* (2013.01); *B60W 2710/1005* (2013.01); *F16H 2061/0096* (2013.01); *F16H 2061/0459* (2013.01)

(58) Field of Classification Search
CPC ............. F16H 61/04; F16H 2061/0096; F16H 2061/0459; B60W 2710/1005; B60W 10/10; B60W 2540/10; B60W 2510/18; B60W 2520/10
See application file for complete search history.

(56) References Cited

U.S. PATENT DOCUMENTS

| 2005/0054480 A1* | 3/2005 | Ortmann | ............... B60W 10/10 477/6 |
| 2016/0090094 A1* | 3/2016 | Ichikawa | ............... B60W 10/11 477/107 |
| 2020/0208736 A1* | 7/2020 | Fujii | ..................... B60W 20/30 |

FOREIGN PATENT DOCUMENTS

| JP | 2007132385 | 5/2007 |
| JP | 2017180703 A | * 10/2017 |

* cited by examiner

*Primary Examiner* — Justin Holmes
(74) *Attorney, Agent, or Firm* — JCIPRNET

(57) ABSTRACT

Provided is a gear change control device of automatic transmission for vehicles. The gear change control device of automatic transmission includes a gear change control part which performs upshift gear change control and downshift gear change control of an automatic transmission according to a shift map. When an operation of a brake operation element is detected and full closure of an accelerator is detected, the gear change control part calculates, based on a change amount of a vehicle speed and a pressure of a brake master cylinder, a determination counter value for determining whether or not to execute the downshift of the automatic transmission, and when the determination counter value is equal to or greater than a threshold value (first threshold value), the gear change control part performs the downshift of the automatic transmission.

5 Claims, 4 Drawing Sheets

GEAR CHANGE CONTROL DEVICE OF AUTOMATIC TRANSMISSION FOR VEHICLE

CROSS-REFERENCE TO RELATED APPLICATION

This application claims the priority benefit of Japan application serial no. 2020-062346, filed on Mar. 31, 2020. The entirety of the above-mentioned patent application is hereby incorporated by reference herein and made a part of this specification.

BACKGROUND

Technical Field

The disclosure relates to a gear change control device of automatic transmission for vehicles.

Related Art

Generally, a gear change control device of automatic transmission for vehicles prepares a plurality of types of shift maps for obtaining gear change characteristics, obtains a value indicating travel resistance through an acceleration to determine whether a vehicle is on a flat road, an uphill road, or a downhill road, selects one of the shift maps, and controls a gear ratio based on the selected shift map. That is, an expected acceleration preset based on engine output is compared with an actual acceleration actually obtained, a degree of uphill/downhill slope (road gradient) is determined to select an optimum shift map, and the gear ratio is decided based on the selected shift map.

When the gear change control is performed based on the shift map in this way, a travel state at the time of executing the gear change is uniquely decided, and a driver has less freedom in gear change control. Therefore, there is an automatic transmission which is equipped with, in addition to the aforementioned automatic gear change mode in which a gear change stage or a gear ratio to be set is determined based on the travel state to perform the gear change action, a manual gear change mode in which a gear change action instructed by a manual operation of the user is performed. This automatic transmission is configured to be capable of instructing the gear change action by the manual operation in a way of instructing an upshift or a downshift by, for example, an operation of a shift lever in a manual range or a paddle switch arranged on a steering wheel (for example, see patent literature 1).

Besides, conventionally, in a situation of traveling on a downhill road for a long time only by a brake operation (a braking operation of the vehicle by depressing a brake pedal) of the driver, engine brake is realized by performing a downshift in a way that the driver operates the shift lever or the paddle switch. Therefore, conventionally, gear change control has not been performed in which the downshift of the gear change stage is appropriately performed in an automatic way by grasping an intention of the driver (an intention of decelerating the vehicle) in advance, and the engine brake required for deceleration is realized at the optimum timing.

LITERATURE OF RELATED ART

Patent Literature

[Patent literature 1] Japanese Patent Laid-Open No. 2007-132385

SUMMARY

The disclosure is completed to solve the above problems, and an object of the disclosure is to provide a gear change control device of automatic transmission for vehicles which can improve a feeling of security of a driver in gear change control of an automatic transmission by appropriately determining a situation in which engine brake is required in a case of traveling on a downhill road or other cases to automatically perform downshift even if the driver does not perform the downshift operation.

The disclosure for solving the above problems is a gear change control device of an automatic transmission (6) that shifts rotation of a drive source (2) mounted on a vehicle (1) and outputs the rotation to a driving wheel (W) side, including: a gear change control part (20) which performs upshift gear change control and downshift gear change control of the automatic transmission (6) according to a shift map in which upshift and downshift gear change patterns are set for each gear change stage; a vehicle speed detection part (15) which detects a vehicle speed; an accelerator opening degree detection part (16) which detects an accelerator opening degree; a brake operation detection part (18) which detects an operation of a brake operation element (23) by a driver; and a brake pressure detection part (19) which detects a pressure of a brake master cylinder (24) caused by the operation of the brake operation element (23), wherein when the brake operation detection part (18) detects the operation of the brake operation element (23) and the accelerator opening degree detection part (16) detects that the accelerator is fully closed, the gear change control part (20) calculates, based on a change amount of the vehicle speed detected by the vehicle speed detection part (15) and the pressure of the brake master cylinder (24) detected by the brake pressure detection part (19), a determination counter value for determining whether or not to execute the downshift of the automatic transmission (6), and when the determination counter value is equal to or greater than a first threshold value, the gear change control part (20) performs the downshift of the automatic transmission (6).

According to the control device of automatic transmission for vehicles of the disclosure, when the determination counter value, which is calculated based on the change amount of the vehicle speed and the pressure of the brake master cylinder when the operation of the brake operation element is detected and the full closure of the accelerator is detected, is equal to or greater than the first threshold value, the gear change control part performs the downshift of the automatic transmission, and thus it can be appropriately determined that the operation of the brake operation element by the driver of the vehicle is performed, and the downshift of the automatic transmission can be performed based on the appropriate determination. Thereby, a deceleration intention of the driver can be appropriately grasped and engine brake required for the deceleration can be realized. Thus, a feeling of the driver for the gear change control (downshift control) of the automatic transmission in a case of traveling on a downhill road or other cases can be improved.

In addition, in the control device of automatic transmission for vehicles, when the pressure of the brake master cylinder (24) is equal to or greater than a second threshold value, the gear change control part (20) may perform the downshift of the automatic transmission (6).

According to the configuration, when the pressure of the brake master cylinder is equal to or greater than the second threshold value, the downshift of the automatic transmission is performed, and thereby the operation of the brake operation element by the driver and the downshift of the automatic transmission can be synchronized. Thus, the deceleration intention of the driver can be appropriately grasped and the engine brake required for the deceleration can be realized at a more appropriate timing.

In addition, in the control device of automatic transmission for vehicles, the gear change control part (20) may have a table of addition-subtraction values which are preset based on the change amount of the vehicle speed and the pressure of the brake master cylinder (24), and may add and subtract the addition-subtraction values according to the table of the addition-subtraction values, thereby calculating the determination counter value based on values obtained by the addition and subtraction.

According to the configuration, the addition-subtraction values are added and subtracted according to the table of the addition-subtraction values which are preset based on the change amount of the vehicle speed and the pressure of the brake master cylinder, and the determination counter value is calculated based on the values obtained by the addition and subtraction. Thereby, the deceleration intention of the driver can be more appropriately grasped based on the change amount of the vehicle speed and the pressure of the brake master cylinder, and the engine brake required for the deceleration can be realized at a more appropriate timing.

In addition, with respect to each addition-subtraction value in the table of the addition-subtraction values, weighting of the number of times of the addition and subtraction may be set; and the greater the pressure of the brake master cylinder (24), the greater the number of times of the addition and subtraction may be set, and the greater the change amount of the vehicle speed, the greater the number of times of the addition and subtraction may be set.

According to the configuration, the greater the pressure of the brake master cylinder, the greater the number of times of the addition and subtraction is set, and the greater the change amount of the vehicle speed, the greater the number of times of the addition and subtraction is set. Therefore, the greater a quantity of the operation of the brake operation element by the driver, the greater the number of times of the addition and subtraction, and the greater a deceleration of the vehicle, the greater the number of times of the addition and subtraction. Thus, the engine brake required for the deceleration can be realized by performing the downshift at a more appropriate timing according to the deceleration intention of the driver.

Moreover, the reference signs in parentheses above indicate reference signs of constituent elements in an embodiment described later as an example of the disclosure.

According to the control device of automatic transmission for vehicles of the disclosure, the feeling of security of the driver for the gear change control of the automatic transmission can be improved by appropriately determining the situation in which the engine brake is required in a case of traveling on a downhill road or other cases to automatically perform the downshift even if the driver does not perform the downshift operation.

DESCRIPTION OF THE EMBODIMENTS

Figure 1:
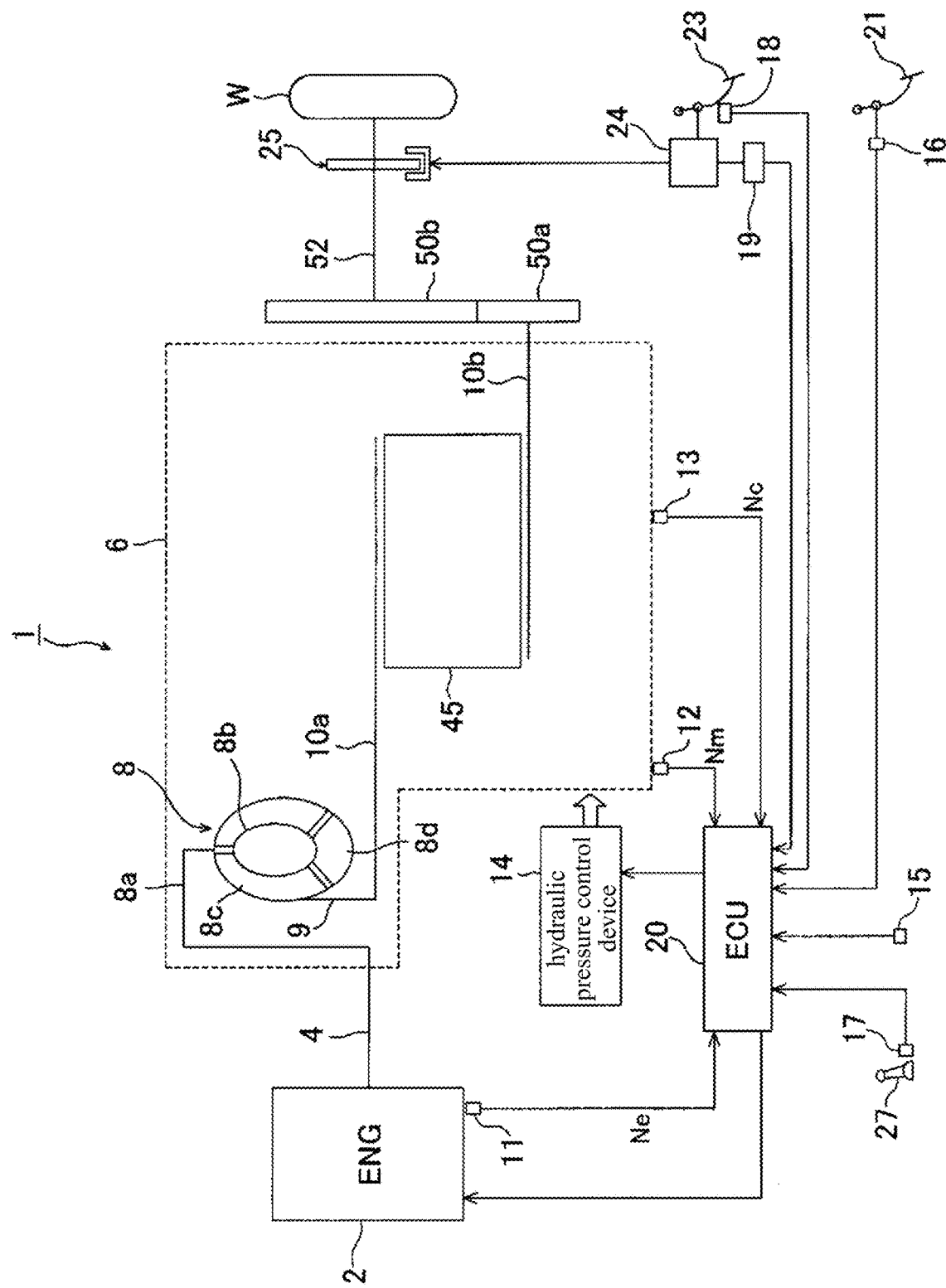
FIG. 1 is a schematic configuration diagram of a vehicle including a gear change control device according to an embodiment of the disclosure.

An embodiment of the disclosure is specifically described below with reference to the accompanying drawings. FIG. 1 is a schematic configuration diagram of a vehicle including a gear change control device of automatic transmission for vehicles according to an embodiment of the disclosure. As shown in FIG. 1, a vehicle 1 includes an engine 2 which is a drive source, a crankshaft 4, an automatic transmission 6, an ECU (control part) 20, and a hydraulic pressure control device 14.

The crankshaft 4 of the engine 2 is coupled to the automatic transmission 6. A torque converter (T/C) 8 arranged in the automatic transmission 6 transmits an engine torque via ATF (hydraulic oil) which is a fluid and has a front cover 8a coupled to the crank shaft 4, an integral pump impeller 8b, a turbine runner 8c arranged in a way of facing the pump impeller 8b between the front cover 8a and the pump impeller 8b, and a stator 8d.

A lockup clutch 9 is arranged between the turbine runner 8c and the front cover 8a. The lockup clutch 9 is engaged with the front cover 8a by being pressed toward an inner surface of the front cover 8a under control of the hydraulic pressure control device 14 based on an instruction of the ECU 20, and the engagement is released by releasing the pressing.

The automatic transmission 6 further includes a main shaft 10a, a counter shaft 10b arranged in parallel with the main shaft 10a, and a gear mechanism 45 consisting of a plurality of gear pairs (not shown) which are set to different gear ratios and arranged on the main shaft 10a side and the counter shaft 10b side.

An output side final gear 50a arranged integrally with the counter shaft 10b of the automatic transmission 6 and a drive side final gear 50b arranged integrally with a drive shaft 52 connected to a driving wheel W of the vehicle 1 form a final gear pair and are always meshed with each other.

In addition, as the detection part for inputting information to the ECU 20, at least an engine rotation number sensor 11, a main shaft rotation number sensor 12, a counter shaft rotation number sensor 13, a vehicle speed sensor 15, an accelerator opening degree sensor 16, a shift position sensor 17 that detects a shift position of the automatic transmission 6, a brake switch (brake operation detection part) 18 that detects whether a driver of the vehicle 1 has operated a brake pedal (brake operation element) 23, a brake working pressure sensor (liquid pressure sensor: brake pressure detection part) 19 that detects a discharge pressure of a hydraulic oil from a brake master cylinder 24 according to a depression operation of the brake pedal 23, and the like are arranged.

The engine rotation number sensor 11 is an engine rotation number detection part for detecting a rotation number Ne of the crankshaft 4 of the engine 2. The main shaft rotation number sensor 12 is an input shaft rotation number detection part for detecting a rotation number Nm of the main shaft 10a. The counter shaft rotation number sensor 13 is an output shaft rotation number detection part for detecting a rotation number Nc of the counter shaft 10b.

Moreover, when the brake pedal 23 is depressed, a pedaling force of the brake pedal 23 is increased by a booster (not shown), and an appropriate working pressure is applied to a brake device 25 of each wheel (only one driving wheel W is shown) from the brake master cylinder 24. The brake device 25 is a disc brake, a drum brake, or the like which is generally known.

Control parameters such as an accelerator pedal opening degree (accelerator opening degree) detected by the accelerator opening degree sensor 16, on/off of the brake pedal 23 detected by the brake switch 18, a brake master cylinder pressure detected by the brake working pressure sensor 19, vehicle speed data detected by the vehicle speed sensor 15, data of the shift position (gear stage) from the shift position sensor 17, and the like are input to the ECU 20.

In addition to controlling the engine 2, the ECU 20 controls a hydraulic pressure of the transmission oil (hereinafter referred to as ATF) to the gear mechanism 45 through the hydraulic pressure control device 14. Thereby, control of a gear ratio set by the automatic transmission 6 (gear change control) can be performed.

Here, the ECU 20 includes a plurality of types of shift maps for obtaining gear change characteristics, and in an automatic gear change mode, the ECU 20 obtains a value indicating travel resistance through an acceleration to determine whether the vehicle 1 is on a flat road, an uphill road, or a downhill road, selects one of the shift maps, and controls the gear ratio of the automatic transmission 6 based on the selected shift map. That is, an expected acceleration preset based on output of the engine 2 is compared with an actual acceleration actually obtained, a degree of uphill/downhill slope (road gradient) is determined to select an optimum shift map, and the gear ratio is decided based on the selected shift map.

In addition, in a manual gear change mode in which a gear change action instructed by a manual operation of the driver of the vehicle 1 is performed, the ECU 20 can instruct the gear change of the automatic transmission 6 by the manual operation in a way of instructing an upshift or a downshift by an operation of a shift lever 27 in a manual range or an operation of a paddle switch (not shown) arranged on a steering wheel.

Furthermore, in the gear change control device of the embodiment, control of the following contents (hereinafter, this control is referred to as "downshift control based on brake operation") is further performed in the gear change control of the automatic gear change mode or the manual gear change mode. Specific contents of the downshift control based on the brake operation are described specifically below.

Figure 2:
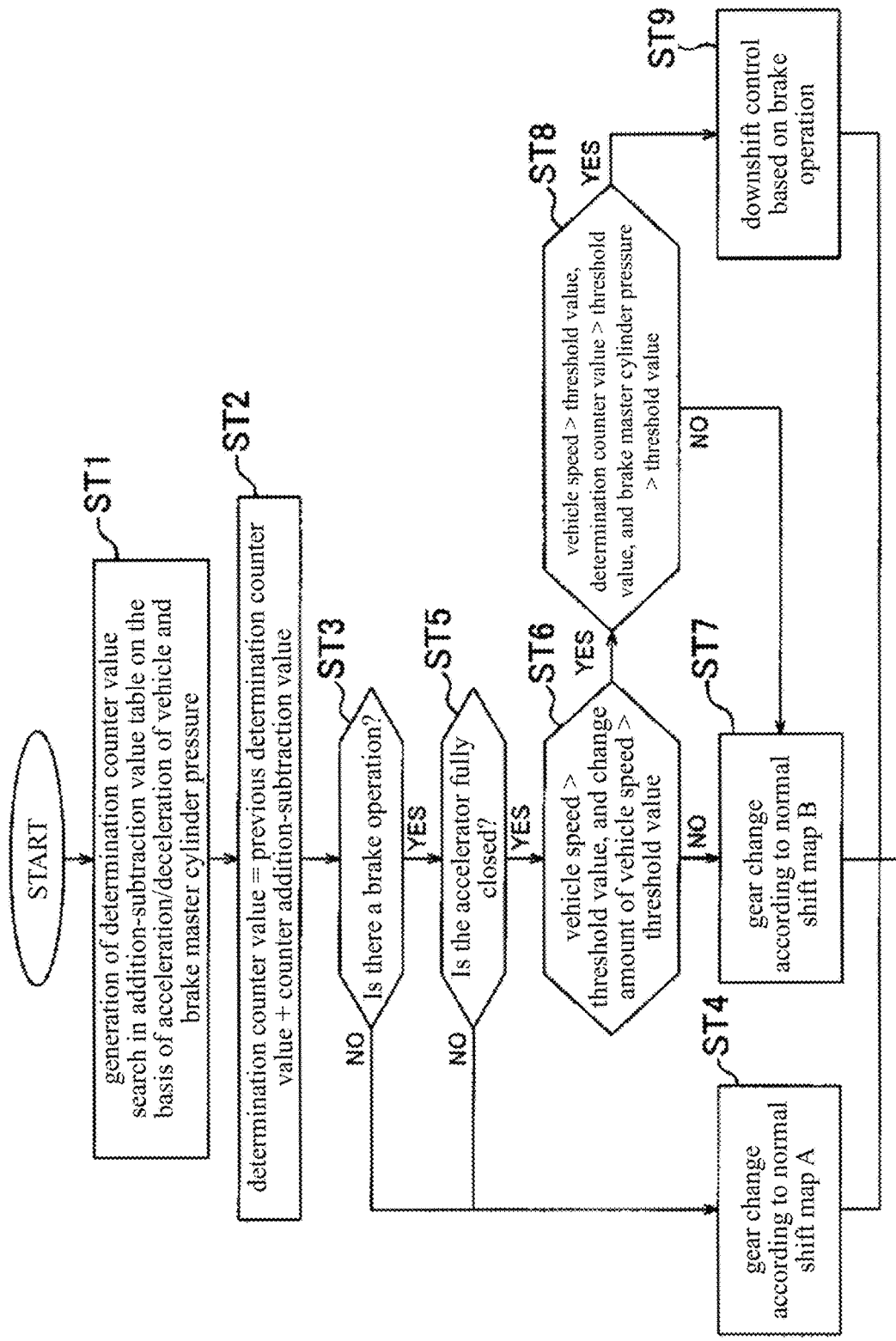
FIG. 2 is a flowchart showing a procedure of downshift control based on a brake operation by the gear change control device of the embodiment.

FIG. 2 is a flowchart showing a procedure of the downshift control based on the brake operation by the gear change control device of the embodiment. In the downshift control based on the brake operation, first, a determination counter value for determining whether or not to execute the downshift of the automatic transmission 6 is generated (step ST1).

Figure 3:
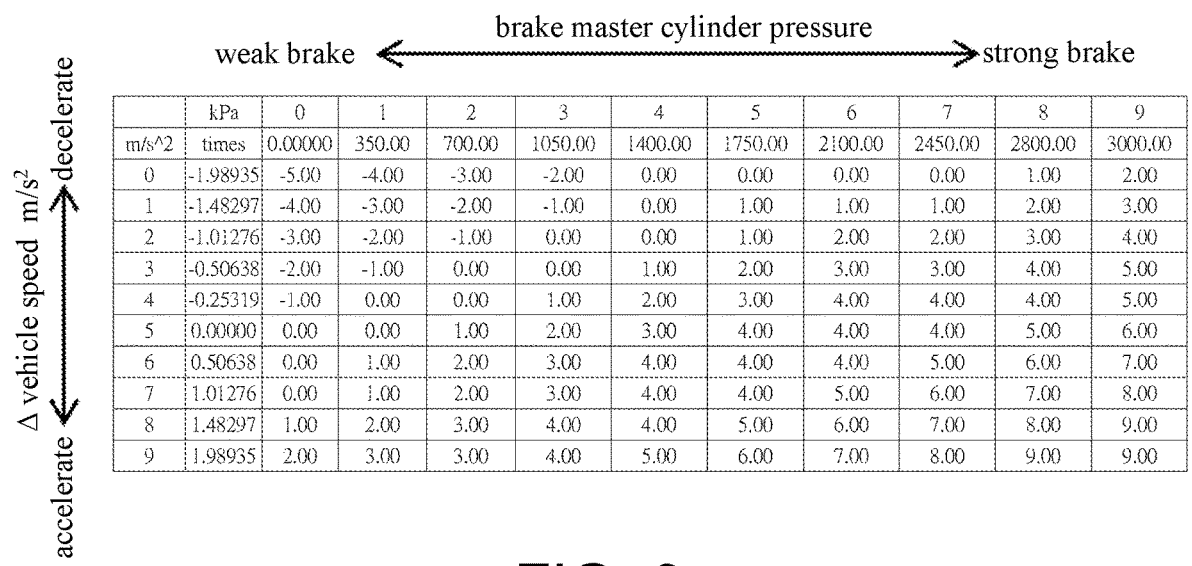
FIG. 3 is a table showing an addition-subtraction value table used to generate a determination counter value.

FIG. 3 is a table showing an addition-subtraction value table used to generate the determination counter value. The table in the diagram is a list of addition-subtraction values with respect to a value of the brake master cylinder pressure detected by the brake working pressure sensor 19 and the number of times of weighting thereof, and a value of a change amount of the vehicle speed detected by the vehicle speed sensor 15 (that is, an acceleration/deceleration of the vehicle 1) and the number of times of weighting thereof. The addition-subtraction values specified in the table are obtained by pre-assigning numerical values, which are in consideration of weighting of a deceleration intention of the driver, to strength of the depression operation of the brake pedal 23 by the driver of the vehicle 1 (=brake master cylinder pressure) and the acceleration/deceleration of the vehicle 1 based on experiments or tests. In the addition-subtraction value table, there is a tendency of the addition-subtraction values that the stronger the depression operation of the brake pedal 23 (the higher the brake master cylinder pressure), the greater the addition-subtraction values, and the greater the acceleration of the vehicle 1 (that is, the smaller the deceleration), the greater the addition-subtraction values. In addition, the number of times of the addition and subtraction (the number of times of being added and subtracted) of the addition-subtraction values has a tendency that the stronger the depression operation of the brake pedal 23 (the higher the brake master cylinder pressure), the more the number of times of the addition and subtraction, and the greater the acceleration of the vehicle 1 (that is, the smaller the deceleration), the more the number of times of the addition and subtraction.

Returning to the flowchart in FIG. 2, in the generation of the determination counter value in step ST1, an addition-subtraction value on the basis of the acceleration/deceleration (the change amount of the vehicle speed) of the vehicle 1 and the brake master cylinder pressure is searched based on the addition-subtraction value table in FIG. 3. Then, the determination counter value is generated by the following formula by using the searched addition-subtraction value (step ST2). Moreover, the determination counter value is generated every predetermined time (for example, every 10 ms).

determination counter value=previous determination counter value+addition-subtraction value Next, whether or not to perform the operation of the brake pedal 23 (the brake operation) is determined (step ST3). This determination is performed by detecting on/off of the brake switch 18. As a result, if the brake operation is not performed (NO), the downshift control based on the brake operation of the embodiment is not performed, and the gear change control (control of downshift or upshift) according to a normal shift map A is performed (step ST4). On the other hand, if the brake operation is performed in step ST3 (YES), determination is subsequently made on whether the accelerator is fully closed (step ST5). This determination is performed based on the accelerator opening degree detected by the accelerator opening degree sensor 16. As a result, the downshift control based on the brake operation of the embodiment is not performed, and the gear change control (control of downshift or upshift) according to the normal shift map is performed (step ST4). On the other hand, if the accelerator is fully closed in step ST5 (YES), determination is subsequently made on whether the vehicle speed detected by the vehicle speed sensor 15 is equal to or greater than a predetermined threshold value and the change amount of the vehicle speed (acceleration/deceleration) is equal to or greater than a predetermined threshold value (step ST6). As a result, if the vehicle speed is not equal to or greater than the predetermined threshold value or the change amount of the vehicle speed (acceleration/deceleration) is not equal to or greater than the predetermined threshold value (NO), the downshift control based on the brake operation of the embodiment is not performed, and the gear change control (control of downshift or upshift) according to a normal shift map B is performed (step ST7). Moreover, the shift map A in step ST4 is a shift map used when the operation of the brake pedal 23 (brake operation) is not performed, and the shift map B in step ST7 is a shift map used when the brake operation is performed. Besides, in the shift map B, a gear change stage in the same vehicle speed range is set to be a gear change stage on a lower speed stage side as compared with the shift map A.

On the other hand, when the vehicle speed detected by the vehicle speed sensor 15 is equal to or greater than the predetermined threshold value and the change amount of the vehicle speed (acceleration/deceleration) is equal to or greater than the predetermined threshold value in the previous step ST6 (YES), determination is subsequently made on whether the vehicle speed detected by the vehicle speed sensor 15 is equal to or greater than the predetermined threshold value, the determination counter value is equal to or greater than a predetermined threshold value (first threshold value), and the brake master cylinder pressure detected by the brake working pressure sensor 19 is equal to or greater than a predetermined threshold value (second threshold value) (step ST8). As a result, if the vehicle speed is less than the predetermined threshold value, the determination counter value is less than the predetermined threshold value (first threshold value), or the brake master cylinder pressure is less than the predetermined threshold value (second threshold value) (NO), the downshift control based on the brake operation of the embodiment is not performed, and the gear change control (control of downshift or upshift) according to the normal shift map B is performed (step ST7). On the other hand, if the vehicle speed is equal to or greater than the predetermined threshold value, the determination counter value is equal to or greater than the predetermined threshold value (first threshold value), and the brake master cylinder pressure is equal to or greater than the predetermined threshold value (second threshold value) in step ST8 (YES), the downshift of the gear change stage by the downshift control based on the brake operation of the embodiment is executed (step ST9).

Figure 4:
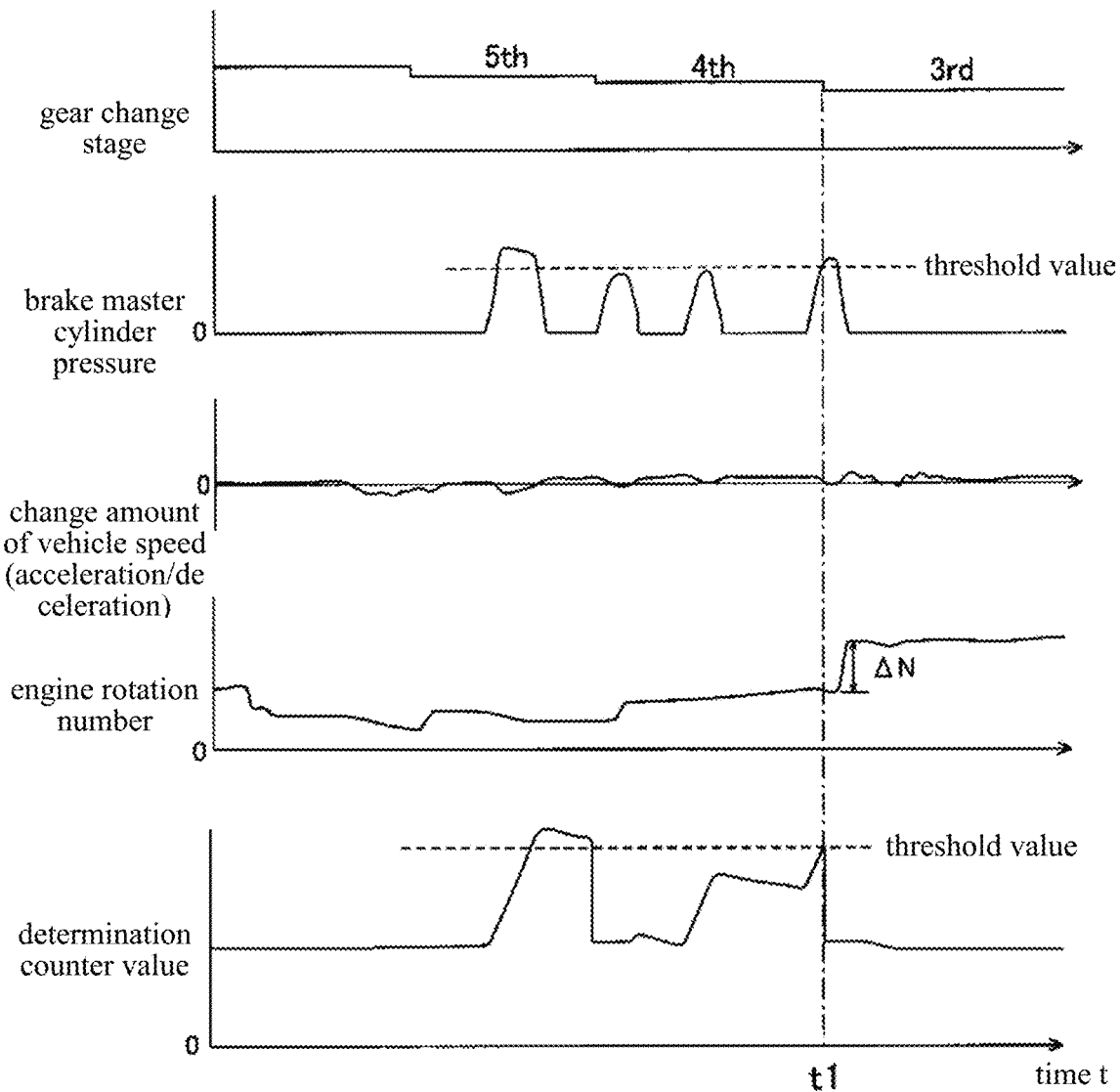
FIG. 4 is a timing chart showing changes in each value in gear change control by the gear change control device.

FIG. 4 is a timing chart showing changes in each value in the downshift control based on the brake operation of the embodiment. The timing chart in the diagram shows the changes in each of the gear change stage of the automatic transmission 6, the brake master cylinder pressure, the change amount of the vehicle speed (acceleration/deceleration), the engine rotation number, and the determination counter value with respect to an elapsed time t. In the downshift control based on the brake operation of the embodiment, when the vehicle 1 is traveling on, for example, a downhill road, the depression operation of the brake pedal 23 by the driver is performed, and thereby the determination counter value is calculated. Then, as shown in the timing chart in the diagram, at a time t1 when the determination counter value becomes equal to or greater than the threshold value (first threshold value) and the brake master cylinder pressure becomes equal to or greater than the threshold value (second threshold value), downshift of the automatic transmission 6 from a fourth speed stage (4th) to a third speed stage (3rd) is executed. Then, the engine brake acts on the vehicle 1 by increasing the engine rotation number by ΔN due to the downshift. The downshift from the fourth speed stage to the third speed stage at the time t1 is a downshift based on the brake operation of the embodiment. Moreover, the threshold value (first threshold value) of the determination counter value here can be, for example, 3,000 times.

As described above, in the downshift control based on the brake operation by the gear change control device of the embodiment, when the operation of the brake pedal 23 is detected by the brake switch (brake operation detection part) 18, and the full closure of the accelerator is detected by the accelerator opening degree sensor (accelerator opening degree detection part) 16, the determination counter value for determining whether or not to execute the downshift of the automatic transmission 6 is calculated based on the change amount of the vehicle speed and the pressure of the brake master cylinder 24, and when the determination counter value is equal to or greater than the threshold value (first threshold value), the downshift of the automatic transmission 6 is performed.

According to the downshift control based on this brake operation, when the determination counter value calculated based on the change amount of the vehicle speed and the pressure of the brake master cylinder 24 is equal to or greater than the threshold value, the downshift of the automatic transmission 6 is performed. Therefore, it can be appropriately determined that the driver of the vehicle 1 has operated the brake pedal 23, and the downshift of the automatic transmission 6 can be performed based on the appropriate determination. Thereby, the deceleration intention of the driver can be appropriately grasped and the engine brake required for the deceleration can be realized. Thus, a feeling of the driver for the gear change control (downshift control) of the automatic transmission 6 in a case of traveling on a downhill road or other cases can be improved.

In addition, in the downshift control based on the brake operation of the embodiment, when the pressure of the brake master cylinder 24 is equal to or greater than the threshold value (second threshold value), the downshift of the automatic transmission 6 is performed, and thereby the operation of the brake pedal 23 by the driver and the downshift of the automatic transmission can be synchronized. Thus, the deceleration intention of the driver can be appropriately grasped and the engine brake required for the deceleration can be realized at a more appropriate timing.

In addition, in the downshift control based on the brake operation of the embodiment, there is the table of the addition-subtraction values which are preset based on the change amount of the vehicle speed and the pressure of the brake master cylinder 24, and the addition-subtraction values are added and subtracted according to the table of the addition-subtraction values, and thereby the determination counter value is calculated based on values obtained by this addition and subtraction.

Accordingly, the addition-subtraction values are added and subtracted according to the table of the addition-subtraction values which are preset based on the change amount of the vehicle speed and the pressure of the brake master cylinder 24, and the determination counter value is calculated based on the values obtained by this addition and subtraction. Thus, the deceleration intention of the driver can be more appropriately grasped based on the change amount of the vehicle speed and the pressure of the brake master cylinder 24, and the engine brake required for the deceleration can be realized at a more appropriate timing.

In addition, in the downshift control based on the brake operation of the embodiment, with respect to each addition-subtraction value in the table of the addition-subtraction values, weighting of the number of times of the addition and subtraction is set; and the greater the pressure of the brake master cylinder 24, the greater the number of times of the addition and subtraction is set, and the greater the change amount of the vehicle speed, the greater the number of times of the addition and subtraction is set.

Accordingly, the greater the pressure of the brake master cylinder 24, the greater the number of times of the addition and subtraction is set, and the greater the change amount of the vehicle speed, the greater the number of times of the addition and subtraction is set. Thus, the greater a quantity of the operation of the brake pedal 23 by the driver, the greater the number of times of the addition and subtraction, and the greater the deceleration of the vehicle 1, the greater the number of times of the addition and subtraction. Thus, the engine brake required for the deceleration can be realized by performing the downshift at a more appropriate timing according to the deceleration intention of the driver.

Although the embodiment of the disclosure is described above, the disclosure is not limited to the above embodiment, and various modifications can be made within the scope of claims and the scope of the technical ideas described in the specification and the drawings.

What is claimed is:

1. A control device of automatic transmission for vehicles, which is a gear change control device of automatic transmission that shifts rotation of a drive source mounted on a vehicle and outputs the rotation to a driving wheel side, comprising:
    a gear change control part which performs upshift gear change control and downshift gear change control of an automatic transmission according to a shift map in which upshift and downshift gear change patterns are set for each gear change stage;
    a vehicle speed detection part which detects a vehicle speed;
    an accelerator opening degree detection part which detects an accelerator opening degree;
    a brake operation detection part which detects an operation of a brake operation element by a driver; and
    a brake pressure detection part which detects a pressure of a brake master cylinder caused by the operation of the brake operation element, wherein
    when the brake operation detection part detects the operation of the brake operation element and the accelerator opening degree detection part detects that the accelerator is fully closed,
    the gear change control part calculates, based on a change amount of the vehicle speed detected by the vehicle speed detection part and the pressure of the brake master cylinder detected by the brake pressure detection part, a determination counter value for determining whether or not to execute the downshift of the automatic transmission, and
    when the determination counter value is equal to or greater than a first threshold value, the gear change control part performs the downshift of the automatic transmission.

2. The control device of automatic transmission for vehicles according to claim 1, wherein
    when the pressure of the brake master cylinder is equal to or greater than a second threshold value, the gear change control part performs the downshift of the automatic transmission.

3. The control device of automatic transmission for vehicles according to claim 1, wherein
    the gear change control part has a table of addition-subtraction values which are preset based on the change amount of the vehicle speed and the pressure of the brake master cylinder, and
    adds and subtracts the addition-subtraction values according to the table of the addition-subtraction values, thereby calculating the determination counter value based on values obtained by the addition and subtraction.

4. The control device of automatic transmission for vehicles according to claim 3, wherein
    with respect to each addition-subtraction value in the table of the addition-subtraction values, weighting of the number of times of the addition and subtraction is set; and
    the greater the pressure of the brake master cylinder, the greater the number of times of the addition and subtraction is set, and the greater the change amount of the vehicle speed, the greater the number of times of the addition and subtraction is set.

5. The control device of automatic transmission for vehicles according to claim 2, wherein
    the gear change control part has a table of addition-subtraction values which are preset based on the change amount of the vehicle speed and the pressure of the brake master cylinder, and
    adds and subtracts the addition-subtraction values according to the table of the addition-subtraction values, thereby calculating the determination counter value based on values obtained by the addition and subtraction.

* * * * *